(12) United States Patent
Wise et al.

(10) Patent No.: US 6,615,760 B1
(45) Date of Patent: Sep. 9, 2003

(54) BOAT DRAIN PLUG

(76) Inventors: George A. Wise, 1315 N. 94th St., Mesa, AZ (US) 85207; Thomas A. Brackett, 3404 N. Sea Pines, Mesa, AZ (US) 85215

( * ) Notice: Subject to any disclaimer, the term of this patent is extended or adjusted under 35 U.S.C. 154(b) by 0 days.

(21) Appl. No.: 10/192,200

(22) Filed: Jul. 10, 2002

(51) Int. Cl.$^7$ ................................................ B63B 13/00
(52) U.S. Cl. ...................................................... 114/197
(58) Field of Search ............................ 114/183 R, 173, 114/197, 198

(56) References Cited

U.S. PATENT DOCUMENTS

| | | |
|---|---|---|
| 271,060 A | 1/1883 | Graham |
| 275,270 A | 4/1883 | Renton |
| 277,102 A | 5/1883 | Baker |
| 847,112 A | 3/1907 | Renton |
| 933,891 A | 9/1909 | Curry |
| 983,620 A | 2/1911 | Hitchcock |
| 987,532 A | 3/1911 | Baab et al. |
| 1,079,627 A | 11/1913 | Adams |
| 2,772,648 A | 12/1956 | Persia |
| 2,919,670 A | 1/1960 | Clark, Jr. et al. |
| 2,929,347 A | 3/1960 | Veltman |
| 3,188,994 A | 6/1965 | Dawson |
| 3,394,671 A | 7/1968 | Mayer |
| 3,459,150 A | 8/1969 | Lunde, Jr. |
| 3,550,548 A | 12/1970 | De Persia |
| 3,565,031 A | 2/1971 | De Persia |
| 3,797,442 A * | 3/1974 | McRae ........................ 114/197 |
| 3,830,185 A | 8/1974 | Scott |
| 3,869,391 A | 3/1975 | Kramer |
| 4,217,846 A | 8/1980 | Wight |
| 4,542,373 A | 9/1985 | Hillock |
| 4,843,376 A | 6/1989 | Wagner et al. |
| 5,047,753 A | 9/1991 | Birchfield |
| 5,162,793 A | 11/1992 | Plost et al. |
| 5,182,556 A | 1/1993 | Plost et al. |
| 5,966,080 A | 10/1999 | Bigsby |
| 6,035,702 A | 3/2000 | Graham |
| 6,477,971 B2 * | 11/2002 | Green ........................ 114/197 |

* cited by examiner

Primary Examiner—Stephen Avila
(74) Attorney, Agent, or Firm—John D. Lister

(57) ABSTRACT

An automatically sealing boat draining device to be mounted in a hole passing through the transom of a boat, includes: a cylindrical housing with a drain hole; a ball valve assembly mounted within and removable from the drain hole; and a plug for sealing the drain hole. The ball valve assembly includes a ball, a sealing ball seat component, and a flow through ball seat component that are held within the drain hole by a retaining ring. A flow of water from the outer end toward the inner end of the drain hole causes the ball to seat in the sealing seat component and seal the drain hole. A flow of water from the inner end toward the outer end of the drain hole causes the ball to seat in the ball flow though seat component and permit the flow of water through the drain hole.

19 Claims, 3 Drawing Sheets

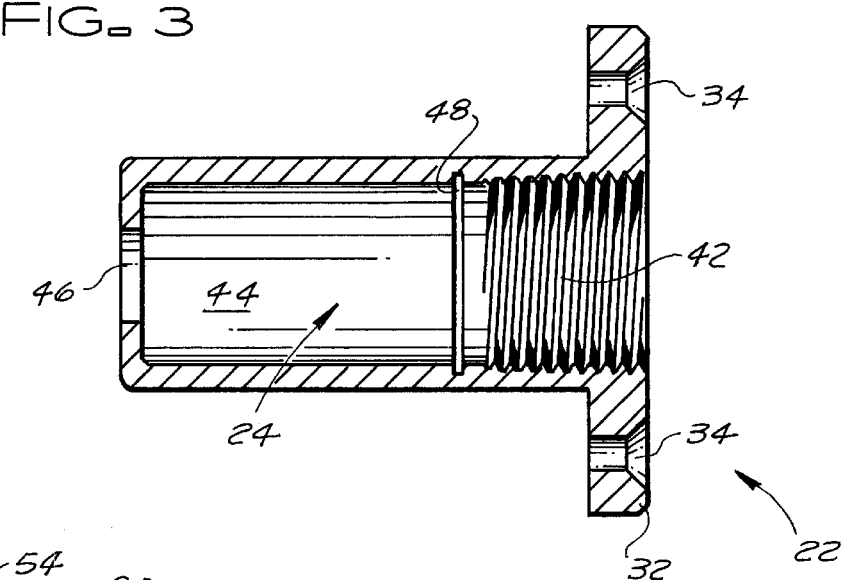
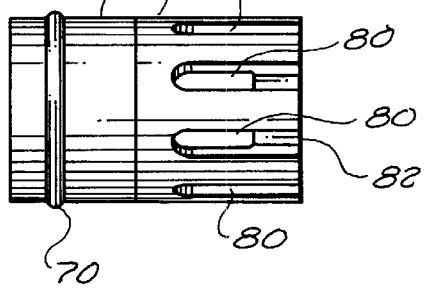
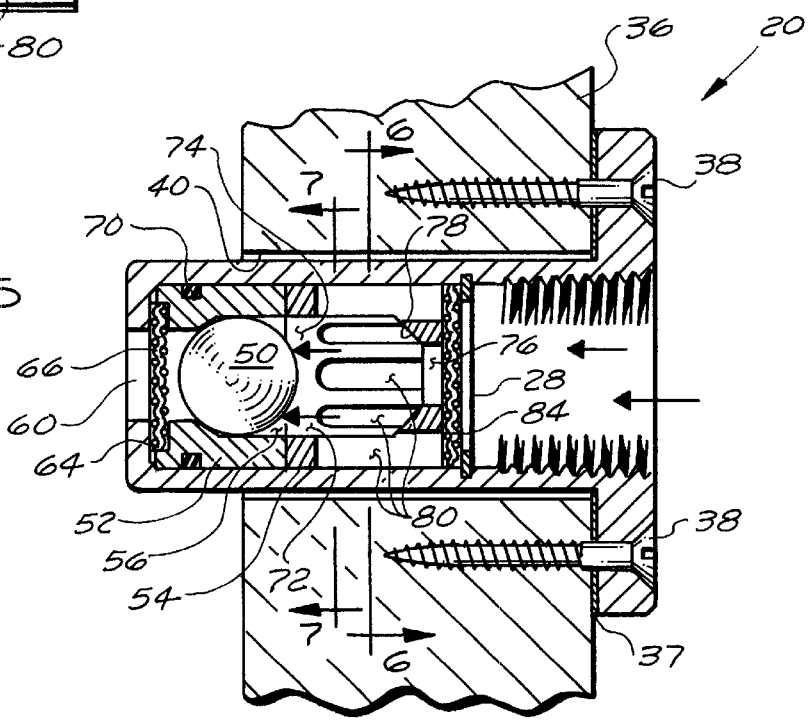

BOAT DRAIN PLUG

BACKGROUND OF THE INVENTION

The subject invention relates to a draining device for draining water from a boat, and in particular, to a draining device for automatically draining water from a boat while the boat is in use that utilizes an automatically sealing ball valve assembly to prevent water from flowing into the boat through the draining device.

Water accumulates in the bottom of most boats. Accordingly, many boats are provided with a drain hole in the bottom or the transom of boat that is normally sealed with a drain hole plug. When the boat is removed from the water, any water that has accumulated within the boat may be drained from the boat by removing the drain hole plug from the drain hole and allowing the water within the boat to drain out through the drain hole. Other boats are provided with draining or bailing devices with various types of ball valves that automatically drain water from the boat when the boat in moving forward through the water and seal when the boat is not moving through the water. U.S. Pat. No. 3,394,671, issued Jul. 30, 1968; U.S. Pat. No. 3,550,548, issued Dec. 29, 1970; U.S. Pat. No. 3,565,031, issued Feb. 23, 1971, and U.S. Pat. No. 4,217,846, issued Aug. 19, 1980 are examples of devices with various types of ball valves for automatically draining water from a boat that seal when the boat is not moving through the water. While these devices enable the automatic draining of water from boats, there is a need for an effective automatic boat draining device that is: simple in construction with no secondary valve; durable; inexpensive; reliable and effective; easy to mount in an existing drain plug hole in the transom of a boat; and easy to quickly disassemble, clean, maintain, and reassemble. In addition, there is a need for such a device that does not project outward from the transom where the device can be damaged by contact with something external of the boat, such as a piling, or present an obstruction on an outside surface of a boat transom to bump against or catch on a person's clothing.

SUMMARY OF THE INVENTION

The boat drain plug of the subject invention is an effective automatic boat draining device that is simple in construction, With no secondary valve, and that automatically seals when a boat is at rest in the water. The automatically sealing boat draining device of the subject invention is durable; inexpensive; reliable and effective; easy to mount in an existing drain plug hole in the transom of a boat; and easy to quickly disassemble, clean, maintain, and reassemble. In addition, the automatically sealing boat draining device of the subject invention only projects outward from the transom for less than one inch and contains no components external of the transom that can be easily damaged by contact with something external of the boat, such as a piling, or that present an obstruction on an outside surface of a boat transom to bump against or easily catch on a person's clothing.

The automatically sealing boat draining device of the subject invention includes: a cylindrical housing with a drain hole; a ball valve assembly mounted within and removable from the drain hole; and a plug for sealing the drain hole. The cylindrical housing of the automatically sealing boat draining device has a radially outwardly extending annular flange at the outer end of the housing through which the housing is secured to the transom of the boat with screws, bolts, or other mechanical fasteners. When mounted on the transom of a boat, the housing flange is substantially flush with the outer surface of the transom and the cylindrical housing extends into the interior of the boat through a hole in transom of the boat.

The water conveying drain hole in the cylindrical housing passes completely through the cylindrical housing from an inner end to the outer end of the cylindrical housing. The drain hole has a cylindrical threaded outer end portion for threadably receiving a plug that seals the drain hole when the boat draining device is not in use; a cylindrical intermediate portion that receives a ball valve assembly; a cylindrical inner end portion for admitting water within a boat into the drain hole; and an annular groove between the cylindrical threaded outer end portion and the intermediate portion of the drain hole for receiving a snap fit retaining ring to retain a ball valve assembly within the intermediate portion of the drain hole.

A ball valve assembly is housed within the cylindrical intermediate portion of the drain hole and retained there by a snap fit retaining ring. The ball valve assembly includes a ball, a sealing ball seat component, and a flow through ball seat component. The sealing ball seat component and the flow through ball seat component each have a central bore therein that, together, form a cavity housing the ball. The bore in the sealing ball seat component forms an inner end of the cavity housing the ball and has a first valve seat for receiving the ball and sealing the drain hole to prevent the flow of water into the boat through the drain hole when the ball in seated in the first valve seat. The bore in the flow through ball seat component forms an outer end of the cavity housing the ball and has a second valve seat for receiving the ball and permitting the flow of water through the drain hole when the ball in seated in the second valve seat. The ball is free to move back and forth between the valve seats at the inner end and the outer end of the cavity housing the ball. A flow of water from the outer end of the drain hole toward the inner end of the drain hole causes the ball to move to the inner end of cavity, seat in the first valve seat, and seal the drain hole to prevent the flow of water through the drain hole. A flow of water from the inner end of the drain hole toward the outer end of the drain hole causes the ball to move to the outer end of cavity, seat in the second valve seat, and permit the flow of water through the drain hole.

The removal of the snap ring from the groove between the intermediate portion and the outer portion of the drain hole permits easy removal of the ball valve assembly from the cylindrical housing for cleaning and maintenance. A plug is removably threaded into the threaded outer end portion of the drain hole when the automatically sealing boat draining device is not in use.

BRIEF DESCRIPTION OF THE DRAWINGS

FIG. 3 is a vertical cross section through the housing of the automatically sealing boat draining device of the subject invention.

FIG. 4 is a side view of the ball valve assembly of the automatically sealing boat draining device of the subject invention.

FIG. 5 is a vertical cross section through the transom of a boat and the automatically sealing boat draining device of the subject invention with the ball valve of the device sealed to prevent the flow of water into a boat.

DESCRIPTION OF THE PREFERRED EMBODIMENTS

Figure 1:
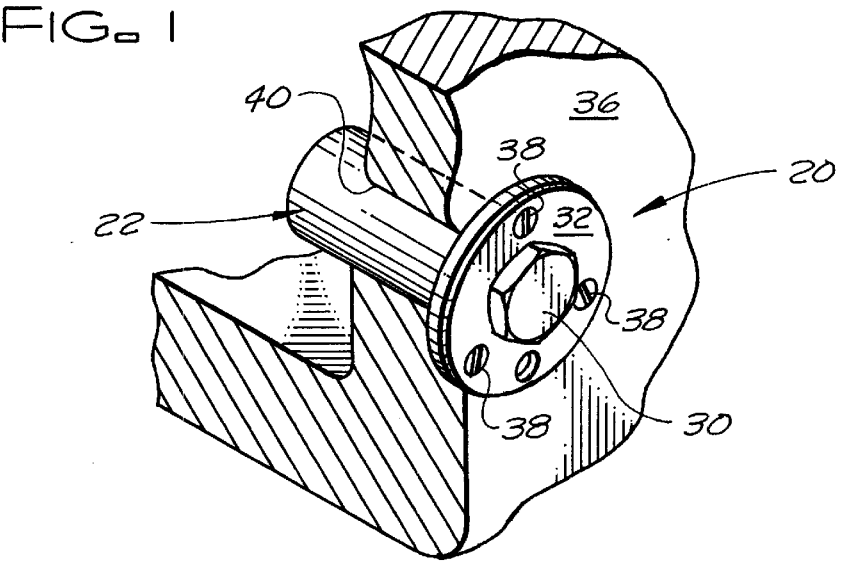
FIG. 1 is a perspective view of the automatically sealing boat draining device of the subject invention mounted in the transom of a boat.
Figure 2:
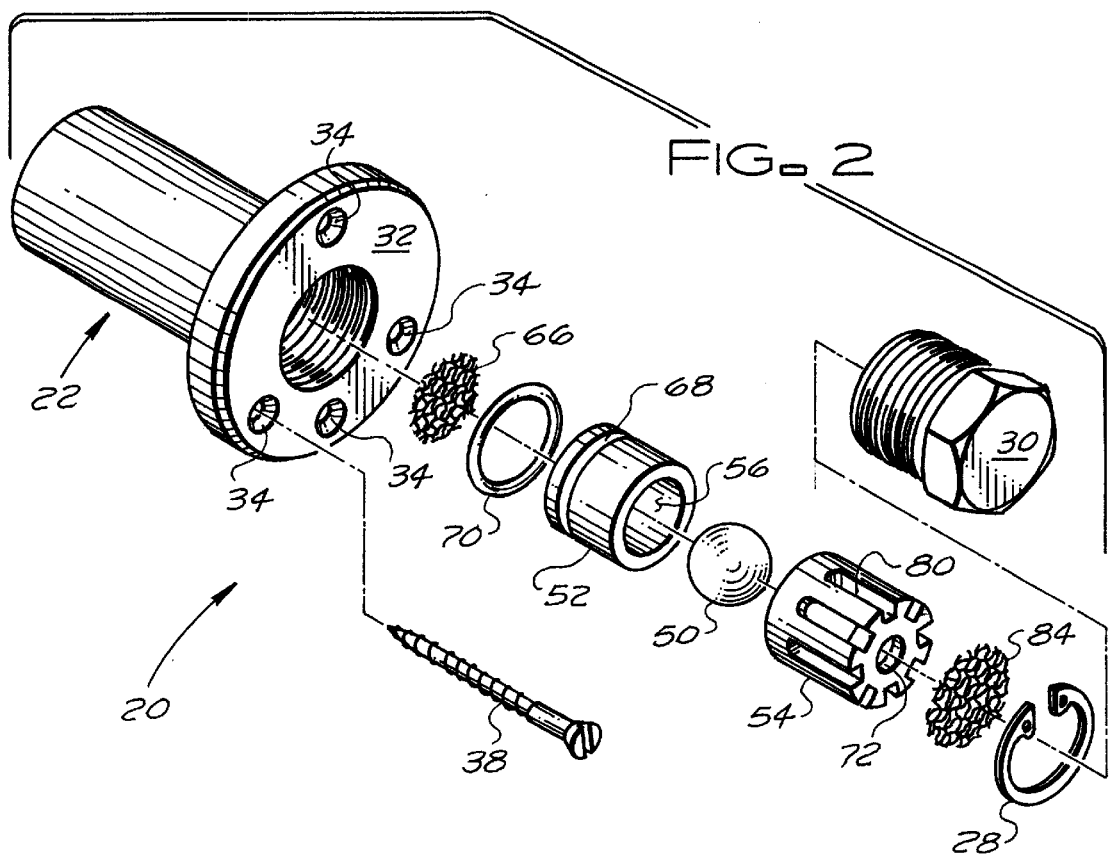
FIG. 2 is a perspective view of the automatically sealing boat draining device of the subject invention, exploded, to better illustrate the components of the device and their relationship.
Figure 6:
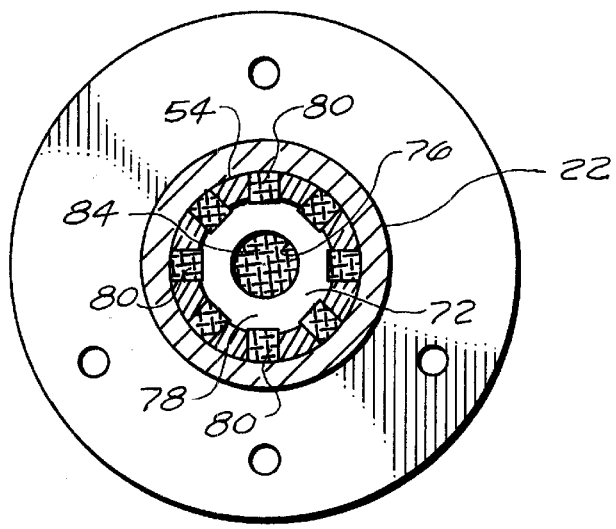
FIG. 6 is a transverse cross section through the automatically sealing boat draining device of the FIG. 5, taken substantially along lines 6—6 of FIG. 5.
Figure 7:
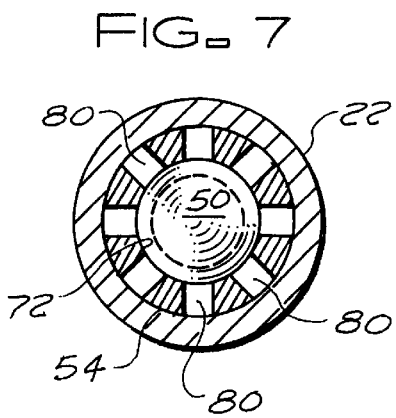
FIG. 7 is a transverse cross section through the automatically sealing boat draining device of the FIG. 5, taken substantially along lines 7—7 of FIG. 5.
Figure 8:
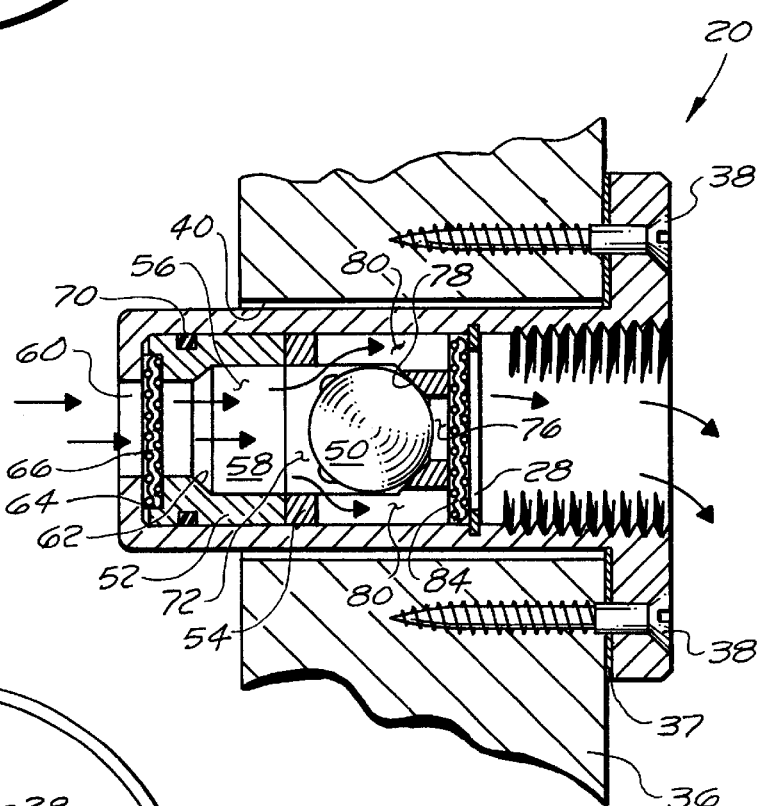
FIG. 8 is a vertical cross section through the transom of a boat and the automatically sealing boat draining device of the subject invention with the ball valve of the device open to permit the flow of water from a boat.
Figure 9:
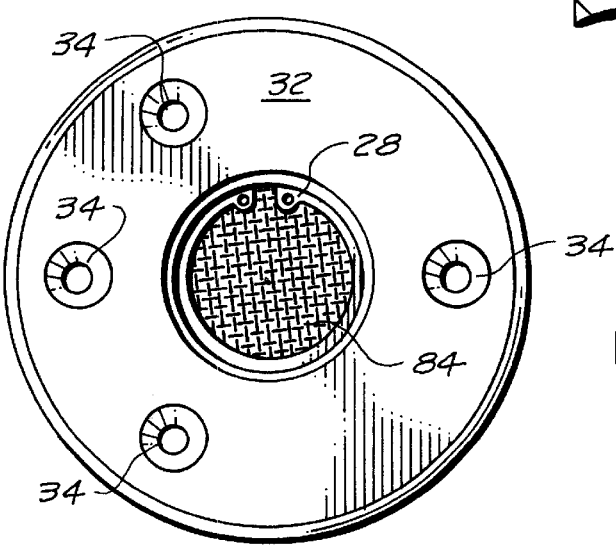
FIG. 9 is an end view of the outer end of the automatically sealing boat draining device of FIG. 7 with the mechanical fasteners removed.

As shown in FIGS. 1 to 9, the automatically sealing boat draining device 20 of the subject invention includes: a cylindrical housing 22 with a drain hole 24; a ball valve assembly 26 mounted within and removable from the drain hole 24; a snap fit resilient retaining ring 28 for retaining the ball valve assembly within the drain hole 24; and a plug 30 for sealing the drain hole when the automatically sealing boat draining device 20 is not in use. The cylindrical housing 22 of the automatically sealing boat draining device 20 has a radially outwardly extending annular flange 32 at the outer end of the housing. The annular flange 32 has a series of holes 34 therein through which the housing is secured to the transom 36 of a boat with mechanical fasteners 38 such as screws or bolts. In the preferred embodiment of the automatically sealing boat draining device 20, there are four holes 34 in the annular flange 32 of the cylindrical housing for receiving the mechanical fasteners 38. The first three of the holes 34 in the annular flange are successively spaced around the annular flange at 120° intervals and the fourth hole 34 is spaced at an 180° interval from one of the first three holes. With this universal hole pattern, the automatically sealing boat draining device 20 can be mounted on a transom with either the standard two-hole or standard three-hole pattern.

When mounted on the transom 36 of a boat, the housing flange 32 is substantially flush with the outer surface of the transom and the remainder of the cylindrical housing 22 extends into the interior of the boat through a hole 40 in the transom of the boat. A conventional caulking or sealing gasket 37 between the housing flange 32 and the outer surface of the transom prevents water from passing between the outer surface of the cylindrical housing 22 and the interior surface of the hole 40 and through the hole 40.

As shown in FIG. 3, the water conveying drain hole 24 in the cylindrical housing 22 of the automatically sealing boat draining device 20 passes completely through the cylindrical housing from an inner end to the outer end of the cylindrical housing. The drain hole 22 has a cylindrical threaded outer end portion 42 for threadably receiving the plug 30 that seals the drain hole 24 when the boat draining device is not in use; a cylindrical intermediate portion 44 for receiving a ball valve assembly 26; a cylindrical inner end portion 46 for admitting water within a boat into the drain hole; and an annular groove 48 between the cylindrical threaded outer end portion 42 and the intermediate portion 44 of the drain hole for receiving the snap fit, resilient retaining ring 28 to retain a ball valve assembly 26 within the intermediate portion of the drain hole 24. The outer end portion 42, the intermediate portion 44 and the inner end.portion 46 of the drain hole 24 are aligned axially in a straight line.

The ball valve assembly 26 is housed within the cylindrical intermediate portion 44 of the drain hole 24 and retained there by the snap fit, resilient retaining ring 28. The ball valve assembly 26 includes a ball 50, a sealing ball seat component 52, and a flow through ball seat component 54. The sealing ball seat component 52 has a central bore 56 therein that extends completely through the component from an outer end to an inner end of the sealing ball seat component 52. The central bore 56 of the sealing ball seat component 52 has an outer end portion 58, an inner end portion 60 smaller in diameter than the outer end portion 58, and a ball valve seat 62 intermediate the outer end portion 58 and the inner end portion 60 for receiving the ball 50 to seal the drain hole. In a preferred embodiment, the ball valve seat 62 has a frustoconical shaped surface that extends between the outer end portion 58 and the inner end portion 60 of the central bore 56. When the ball 50 is received in the ball valve seat 62, the ball 50, which is greater in diameter than the inner end portion 60 of the central bore 56 closes and seals the central bore 56 to seal the drain hole 24.

An inner end surface of the sealing ball seat component 52 has an annular recess 64 therein surrounding the inner end of the central bore 56 of the ball sealing component. A filter screen 66 in the shaped of a disk is retained in the annular recess 64 between the sealing ball seat component 52 and the inner end wall of the housing 22. The filter screen 66 extends across the drain hole 24 between the intermediate portion 44 of the drain hole and the inner portion 46 of the drain hole and filters debris from water passing out through the automatically sealing boat draining device 20 before the water enters the ball valve assembly 26.

An outer cylindrical surface of the tubular sidewall of the ball sealing component 52 has an annular groove 68 therein. A resilient O-ring 70 is retained within the annular groove 68 and forms a seal between the outer cylindrical surface of the sealing ball seat component 52 and the cylindrical interior surface of the intermediate portion 44 of the drain hole 24 to prevent water from bypassing the sealing ball seat component 52 when the ball 50 is seated in the valve seat 62 to seal the drain hole 24.

The flow through ball seat component 54 has a central bore 72 therein that extends completely through the component from an inner end to an outer end of the flow through ball seat component 54. The central bore 72 of the flow through ball seat component 54 has an inner end portion 74, an outer end portion 76 smaller in diameter than the inner end portion 74, a ball valve seat 78 intermediate the inner end portion 74 and the outer end portion 76 for receiving the ball 50 when water is flowing out through the drain hole, and a bypass for conveying water through the flow through ball seat component when the ball 50 is seated in the valve seat 78.

The outer portion 58 of the central bore 56 in the sealing ball seat component 52 and the inner portion 74 of the central bore 72 in the flow through ball seat component 54 form a cavity that houses the ball 50. The outer portion 58 of the central bore 56 of the sealing ball seat component 52 forms an inner end of the cavity housing the ball 50 and the inner portion 74 of the central bore 72 of the flow through ball seat component 54 forms an outer end of the cavity housing the ball 50. The ball 50 is free to move back and forth between the valve seats 62 and 78 at the inner end and the outer end of the cavity housing the ball. A flow of water from the outer end of the drain hole 24 toward the inner end of the drain hole causes the ball 50 to move to the inner end of cavity, seat in the first valve seat 62, and seal the drain hole 24 to prevent the flow of water through the drain hole. A flow of water from the inner end of the drain hole 24 toward the outer end of the drain hole causes the ball 50 to move to the outer end of cavity, seat in the second valve seat 78, and permit the flow of water through the drain hole.

In a preferred embodiment, the ball valve seat 78 has a frustoconical shaped surface that extends between the inner end portion 74 and the outer end portion 76 of the central bore 72. The tubular sidewall of the flow through ball seat component 54 has a series of longitudinally extending slots 80 therein (e.g. 8 slots circumferentially spaced about the flow through ball seat component at 45° intervals) that communicate with both the central bore 72 of the flow through ball seat component and the outer end 82 of the flow through ball seat component to form the bypass for the flow through ball seat component. When the ball 50 is received in the ball valve seat 78 of the flow through ball seat component 54, the ball 50 does not cover and seal the inner end portion 60 of the central bore 56 of the sealing ball seat component 52 or the inner end portions of the longitudinally extending slots 80 in the tubular sidewall of the flow through ball seat component 54. Thus, with the ball 50 seated in the ball valve seat 78 of the flow through ball seat component 54, water can flow from within a boat through the ball valve assembly 26, out through the slots 80 in the flow through ball seat component of the ball valve assembly 26, and out through the outer end portion of the drain hole 24 to drain water from a boat.

A filter screen 84 in the shape of a disk is held against an outer end surface of the flow through ball seat component 54 by the resilient snap fit retaining ring 28. The filter screen 84 extends across the drain hole 24 between the intermediate portion 44 of the drain hole and the outer portion 42 of the drain hole and filters debris from water passing into the automatically sealing boat draining device 20 before the water enters the ball valve assembly 26.

The removal of the resilient snap fit retaining ring 28 from the annular 48 groove between the intermediate portion 44 and the outer portion 42 of the drain hole 24 permits a quick and easy removal of the ball valve assembly 26 from the cylindrical housing 22 for cleaning and maintenance. The plug 30 is threaded into the threaded outer end portion 42 of the drain hole 24 when the automatically sealing boat draining device 20 is not in use and unthreaded and removed from the drain hole 24 when the automatically sealing boat draining device 20 is being used to drain the boat.

Preferably, the housing 22 and the plug 30 are made of brass or another suitable noncorrosive material such as a noncorrosive polymeric material, the screens 66 and 82 are made of stainless steel mesh, and the snap fit resilient retaining ring 28 is made of a noncorrosive spring steel. Preferably, the sealing ball seat component 52 and the flow through ball seat component 54 are made of Teflon polymer or another suitable noncorrosive material. Preferably, the ball 50 is solid, is not buoyant so that it seats well in the seats 62 and 78 of the ball valve components 52 and 54, and is made of Teflon polymer.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An automatically sealing boat draining device to be mounted in a hole passing through the transom of a boat, comprising:

a cylindrical housing; the cylindrical housing having an outer end and an inner end; the cylindrical housing having a radially outwardly extending annular flange at the outer end; the annular flange having means for securing the cylindrical housing to a transom of a boat with the flange mounted on an outside surface of the transom and the cylindrical housing passing through a hole in the transom;

a drain hole for conveying water passing completely through the cylindrical housing from the inner end to the outer end of the cylindrical housing; the drain hole having an outer end and an inner end; the drain hole having a cylindrical threaded outer end portion for threadably receiving a plug to seal the drain hole when the boat draining device is not in use; the drain hole having a cylindrical intermediate portion for receiving a ball valve assembly; the drain hole having a cylindrical inner end portion for admitting water within a boat into the drain hole; the drain hole having an annular groove between the cylindrical threaded outer end portion and the intermediate portion for receiving a snap fit retaining ring to retain a ball valve assembly within the intermediate portion of the drain hole;

a ball valve assembly within the cylindrical intermediate portion of the drain hole; the ball valve assembly including a ball, a sealing ball seat component, and a flow through ball seat component; the sealing ball seat component having a central bore therein; the flow through ball seat component having a central bore therein; the central bores of the sealing ball seat component and the flow through ball seat component forming a cavity housing the ball; the bore in the sealing ball seat component forming an inner end of the cavity housing the ball; the bore in the sealing ball seat component having a first valve seat for receiving the ball and sealing the drain hole to prevent the flow of water through the drain hole when the ball in seated in the first valve seat; the bore in the flow through ball seat component forming an outer end of the cavity housing the ball; the bore in the flow through ball seat component having a second valve seat for receiving the ball and permitting the flow of water through the drain hole when the ball in seated in the second valve seat; the ball being free to move back and forth between the inner end and the outer end of the cavity housing the ball; a flow of water from the outer end of the drain hole toward the inner end of the drain hole causing the ball to move to the inner end of cavity, seat in the first valve seat, and seal the drain hole to prevent the flow of water through the drain hole; a flow of water from the inner end of the drain hole toward the outer end of the drain hole causing the ball to move to the outer end of cavity, seat in the second valve seat, and permit the flow of water through the drain hole;

a snap ring in the annular groove between the outer threaded portion and the intermediate portion of the drain hole retaining the ball valve assembly within the intermediate portion of the drain hole; the removal of the snap ring permitting easy removal of the ball valve assembly from the cylindrical housing for cleaning and maintenance; and a plug removably threaded into the threaded outer end portion of the drain hole.

2. The automatically sealing boat draining device according to claim 1, wherein:

a tubular sidewall of the flow through ball seat component of the ball valve assembly has a plurality of slots therein that communicate with the bore of flow through ball seat component and an outer end of the flow through ball seat component to permit the flow of water through the drain hole when the ball is seated in the second valve seat.

3. The automatically sealing boat draining device according to claim 2, wherein:

the ball-sealing component of the ball valve assembly has an annular groove in an outer surface of the ball-sealing component; an o-ring is seated in the annular groove of the ball-sealing component; and the o-ring forms a watertight seal between the ball sealing component and the cylindrical intermediate portion of the drain hole.

4. The automatically sealing boat draining device according to claim 3, wherein:

the ball valve assembly includes a first filter screen secured intermediate an inner end of the sealing ball seat component and a shoulder of the cylindrical housing between the intermediate portion of the drain hole and the inner end portion of the drain hole; the first filter screen functioning to filter debris from water passing into the drain hole from within a boat; and the ball valve assembly includes a second filter screen secured intermediate an outer end of the flow through ball seat component and the snap ring; the second filter screen functioning to filter debris from water passing into the drain hole from outside a boat.

5. The automatically sealing boat draining device according to claim 1, wherein:

the ball-sealing component of the ball valve assembly has an annular groove in an outer surface of the ball-sealing component; an o-ring is seated in the annular groove of the ball-sealing component; and the o-ring forms a watertight seal between the ball sealing component and the cylindrical intermediate portion of the drain hole.

6. The automatically sealing boat draining device according to claim 1, wherein:

the ball valve assembly includes a first filter screen secured intermediate an inner end of the sealing ball seat component and a shoulder of the cylindrical housing between the intermediate portion of the drain hole and the inner end portion of the drain hole; the first filter screen functioning to filter debris from water passing into the drain hole from within a boat; and the ball valve assembly includes a second filter screen secured intermediate an outer end of the flow through ball seat component and the snap ring; the second filter screen functioning to filter debris from water passing into the drain hole from outside a boat.

7. The automatically sealing boat draining device according to claim 1, wherein:

the outer end portion, the intermediate portion and the inner end portion of the drain hole are aligned axially.

8. The automatically sealing boat draining device according to claim 1, wherein:

the means for securing the cylindrical housing to a transom of a boat is a series of holes in the annular flange of the cylindrical housing for receiving mechanical fasteners.

9. The automatically sealing boat draining device according to claim 1, wherein:

the means for securing the cylindrical housing to a transom of a boat are four holes in the annular flange of the cylindrical housing for receiving mechanical fasteners; a first three of the holes in the annular flange are successively spaced around the annular flange at 120° intervals; and the fourth hole is spaced at a 180° interval from one of the first three holes.

10. An automatically sealing boat draining device to be mounted in a hole passing through the transom of a boat, consisting essentially of:

a cylindrical housing; the cylindrical housing having an outer end and an inner end; the cylindrical housing having a radially outwardly extending annular flange at the outer end; the annular flange having means for securing the cylindrical housing to a transom of a boat with the flange mounted on an outside surface of the transom and the cylindrical housing passing through a hole in the transom of the boat;

a drain hole for conveying water passing completely through the cylindrical housing from the inner end to the outer end of the cylindrical housing; the drain hole having an outer end and an inner end; the drain hole having a cylindrical threaded outer end portion for threadably receiving a plug to seal the drain hole when the boat draining device is not in use; the drain hole having a cylindrical intermediate portion for receiving a ball valve assembly; the drain hole having a cylindrical inner end portion for admitting water within a boat into the drain hole; the drain hole having an annular groove between the cylindrical threaded outer end portion and the intermediate portion for receiving a snap fit retaining ring to retain a ball valve assembly within the intermediate portion of the drain hole;

a ball valve assembly within the cylindrical intermediate portion of the drain hole; the ball valve assembly including a ball, a sealing ball seat component, and a flow through ball seat component; the sealing ball seat component having a central bore therein; the flow through ball seat component having a central bore therein; the central bores of the sealing ball seat component and the flow through ball seat component forming a cavity housing the ball; the bore in the sealing ball seat component forming an inner end of the cavity housing the ball; the bore in the sealing ball seat component having a first valve seat for receiving the ball and sealing the drain hole to prevent the flow of water through the drain hole when the ball in seated in the first valve seat; the bore in the flow through ball seat component forming an outer end of the cavity housing the ball; the bore in the flow through ball seat component having a second valve seat for receiving the ball and permitting the flow of water through the drain hole when the ball in seated in the second valve seat; the ball being free to move back and forth between the inner end and the outer end of the cavity housing the ball; a flow of water from the outer end of the drain hole toward the inner end of the drain hole causing the ball to move to the inner end of cavity, seat in the first valve seat, and seal the drain hole to prevent the flow of water through the drain hole; a flow of water from the inner end of the drain hole toward the outer end of the drain hole causing the ball to move to the outer end of cavity, seat in the second valve seat, and permit the flow of water through the drain hole;

a snap ring in the annular groove between the outer threaded portion and the intermediate portion of the drain hole retaining the ball valve assembly within the intermediate portion of the drain hole; the removal of the snap ring permitting easy removal of the ball valve assembly from the cylindrical housing for cleaning and maintenance; and a plug removably threaded into the threaded outer end portion of the drain hole.

11. A boat with an automatically sealing boat draining device, comprising:

a boat with a transom, the transom having a hole passing therethrough from an interior surface to an exterior surface of the boat;

an automatically sealing boat draining device;

the automatically sealing boat draining device having a cylindrical housing; the cylindrical housing having an outer end and an inner end; the cylindrical housing having a radially outwardly extending annular flange at the outer end; the cylindrical housing being secured to the transom of the boat with the flange mounted on an outside surface of the transom and a remainder of the cylindrical housing passing through the hole in the transom of the boat;

the automatically sealing boat draining device having a drain hole for conveying water passing completely through the cylindrical housing from the inner end to the outer end of the cylindrical housing; the drain hole having an outer end and an inner end; the drain hole having a cylindrical threaded outer end portion for threadably receiving a plug to seal the drain hole when the boat draining device is not in use; the drain hole having a cylindrical intermediate portion for receiving a ball valve assembly; the drain hole having a cylindrical inner end portion for admitting water within the boat into the drain hole; the drain hole having an annular groove between the cylindrical threaded outer end portion and the intermediate portion for receiving a snap fit retaining ring to retain a ball valve assembly within the intermediate portion of the drain hole;

the automatically sealing boat draining device having a ball valve assembly within the cylindrical intermediate portion of the drain hole; the ball valve assembly including a ball, a sealing ball seat component, and a flow through ball seat component; the sealing ball seat component having a central bore therein; the flow through ball seat component having a central bore therein; the central bores of the sealing ball seat component and the flow through ball seat component forming a cavity housing the ball; the bore in the sealing ball seat component forming an inner end of the cavity housing the ball; the bore in the sealing ball seat component having a first valve seat for receiving the ball and sealing the drain hole to prevent the flow of water through the drain hole when the ball in seated in the first valve seat; the bore in the flow through ball seat component forming an outer end of the cavity housing the ball; the bore in the flow through ball seat component having a second valve seat for receiving the ball and permitting the flow of water through the drain hole when the ball in seated in the second valve seat; the ball being free to move back and forth between the inner end and the outer end of the cavity housing the ball; a flow of water from the outer end of the drain hole toward the inner end of the drain hole causing the ball to move to the inner end of cavity, seat in the first valve seat, and seal the drain hole to prevent the flow of water through the drain hole; a flow of water from the inner end of the drain hole toward the outer end of the drain hole causing the ball to move to the outer end of cavity, seat in the second valve seat, and permit the flow of water through the drain hole;

the automatically sealing boat draining device having a snap ring in the annular groove between the outer threaded portion and the intermediate portion of the drain hole retaining the ball valve assembly within the intermediate portion of the drain hole; the removal of the snap ring permitting easy removal of the ball valve assembly from the cylindrical housing for cleaning and maintenance; and the automatically sealing boat draining device having a plug removably threaded into the threaded outer end portion of the drain hole.

12. The boat with an automatically sealing boat draining device according to claim 11, wherein:

a tubular sidewall of the flow through ball seat component of the ball valve assembly of the automatically sealing boat draining device has a plurality of slots therein that communicate with the bore of flow through ball seat component and an outer end of the flow through ball seat component to permit the flow of water through the drain hole when the ball is seated in the second valve seat.

13. The boat with an automatically sealing boat draining device according to claim 12, wherein:

the ball-sealing component of the ball valve assembly of the automatically sealing boat draining device has an annular groove in an outer surface of the ball-sealing component; an o-ring is seated in the annular groove of the ball-sealing component; and the o-ring forms a watertight seal between the ball sealing component and the cylindrical intermediate portion of the drain hole in the cylindrical housing of the automatically sealing boat draining device.

14. The boat with an automatically sealing boat draining device according to claim 13, wherein:

the ball valve assembly of the automatically sealing boat draining device includes a first filter screen secured intermediate an inner end of the sealing ball seat component and a shoulder of the cylindrical housing between the intermediate portion of the drain hole and the inner end portion of the drain hole; the first filter screen functioning to filter debris from water passing into the drain hole from within a boat; and the ball valve assembly of the automatically sealing boat draining device includes a second filter screen secured intermediate an outer end of the flow through ball seat component and the snap ring; the second filter screen functioning to filter debris from water passing into the drain hole from outside a boat.

15. The boat with an automatically sealing boat draining device according to claim 11, wherein:

the ball-sealing component of the ball valve assembly of the automatically sealing boat draining device has an annular groove in an outer surface of the ball-sealing component; an o-ring is seated in the annular groove of the ball-sealing component; and the o-ring forms a watertight seal between the ball sealing component and the cylindrical intermediate portion of the drain hole.

16. The boat with an automatically sealing boat draining device according to claim 11, wherein:

the ball valve assembly of the automatically sealing boat draining device includes a first filter screen secured intermediate an inner end of the sealing ball seat component and a shoulder of the cylindrical housing between the intermediate portion of the drain hole and the inner end portion of the drain hole; the first filter screen functioning to filter debris from water passing into the drain hole from within a boat; and the ball valve assembly of the automatically sealing boat draining device includes a second filter screen secured intermediate an outer end of the flow through ball seat component and the snap ring; the second filter screen functioning to filter debris from water passing into the drain hole from outside a boat.

17. The boat with an automatically sealing boat draining device according to claim 11, wherein:

the outer end portion, the intermediate portion and the inner end portion of the drain hole in the cylindrical housing of the automatically sealing boat draining device are aligned axially.

18. The boat with an automatically sealing boat draining device according to claim 11, wherein:

the cylindrical housing of the automatically sealing boat draining device is secured to the transom of a boat by mechanical fasteners passing through a series of holes in the annular flange of the cylindrical housing.

19. The boat with an automatically sealing boat draining device according to claim 11, wherein:

there are four holes in the annular flange of the cylindrical housing of the automatically sealing boat draining device for receiving mechanical fasteners; a first three of the holes in the annular flange are successively spaced around the annular flange at 120° intervals; and the fourth hole is spaced at a 180° interval from one of the first three holes; and the cylindrical housing of the automatically sealing boat draining device is secured to the transom of a boat by mechanical fasteners passing through at least two of the four holes in the annular flange of the cylindrical housing.

\* \* \* \* \*